Jan. 16, 1940.  A. LEIB  2,187,588

DIRECTION FINDER COMPENSATOR

Filed Dec. 31, 1936  2 Sheets-Sheet 1

INVENTOR
AUGUST LEIB
BY
ATTORNEY

Jan. 16, 1940.  A. LEIB  2,187,588
DIRECTION FINDER COMPENSATOR
Filed Dec. 31, 1936   2 Sheets-Sheet 2
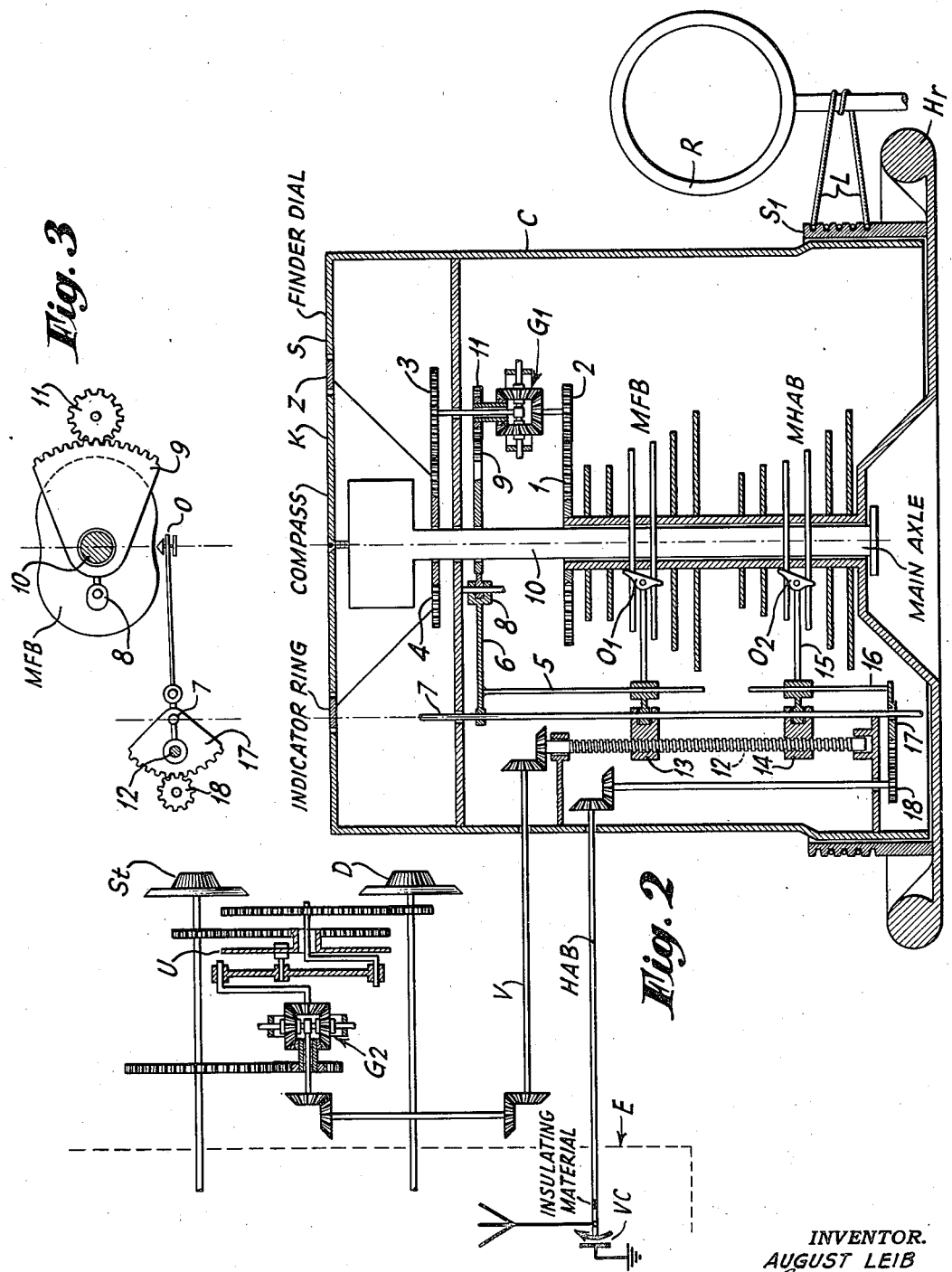
INVENTOR.
AUGUST LEIB
BY
ATTORNEY.

Patented Jan. 16, 1940

2,187,588

UNITED STATES PATENT OFFICE 2,187,588

DIRECTION FINDER COMPENSATOR

August Leib, Berlin, Germany, assignor to Telefunken Gesellschaft für Drahtlose Telegraphie m. b. H., Berlin, Germany, a corporation of Germany Application December 31, 1936, Serial No. 118,442
In Germany November 8, 1935

10 Claims. (Cl. 250—11)

This invention relates to an improved direction finder method, whereby the influence of the direction adjustment of directional antenna on the end result is taken into consideration.

In direction finding on moving craft with directional antennas, in particular frame antennas, a correct result is never received directly. A number of influences must be taken into account which falsify the result of the direction finding.

Above all, conductors of all type metallic superstructures on vessels and the like in the vicinity of the directional aerial exert a considerable disturbing action. A large portion of the radiation which does not directly reach the antenna is reflected on the metallic objects in the immediate vicinity. A rotation of the directed rays (phase shift) takes place with the reflection. The components of direct and indirect radiation are combined to a resulting vector which has a substantially different orientation than the component of the direct radiation proper. The influence of the surroundings of the directional antenna, the so-called goniometric error FB, is determined by comparison of the actual course radio direction finding result with the exact optical direction finding. The values of correction are plotted on a so-called goniometric error table which is provided with a polar system of coordinates, etched in the table surface. This disc or table is inserted in the path of transmission between the hand-wheel of the finder and the indicator plate. By the aid of mechanical transmitting elements, the true direction of the received wave is automatically indicated on the indicator plate.

The direction finding minimum that can theoretically be expected is further distorted by the circumstance that for instance an adjacent antenna or mast acts, dut to its energy absorption at the given transmitter and back-radiation of this energy, on the field of the finder frame or loop, (mast effect or vertical effect).

This undesirable influence may, for instance, be eliminated in the manner that a small, non-tuned, linear antenna is coupled with the receiving circuit of the frame. The energy absorbed by this auxiliary antenna, the so-called auxiliary antenna HAB, is regulated according to phase and amplitude in such manner that the distortion of the direction finding minimum is equalized.

The auxiliary antenna is likewise regulated automatically and this either in the manner known in the art electrically by means of suitable coupling means, or as has been proposed lately, mechanically, making use of controlling cams which likewise are actuated as a function of the frame or loop bearing.

These control cams, herein called auxiliary antenna cams, have a certain external similarity to the goniometric error plates. The auxiliary antenna cams are moved as function of the rotation of the direction finding antenna.

Referring to the accompanying drawings;

Fig. 2 is a sectional diagram of an assembly of the handwheel operating portion of a direction finder compensator of this invention;

Fig. 3 is a partial plan view of Fig. 2;

The prior art effected the direction finding mostly with long waves. The goniometric error and auxiliary antenna were determined for the long-wave range in question.

Figure 1:
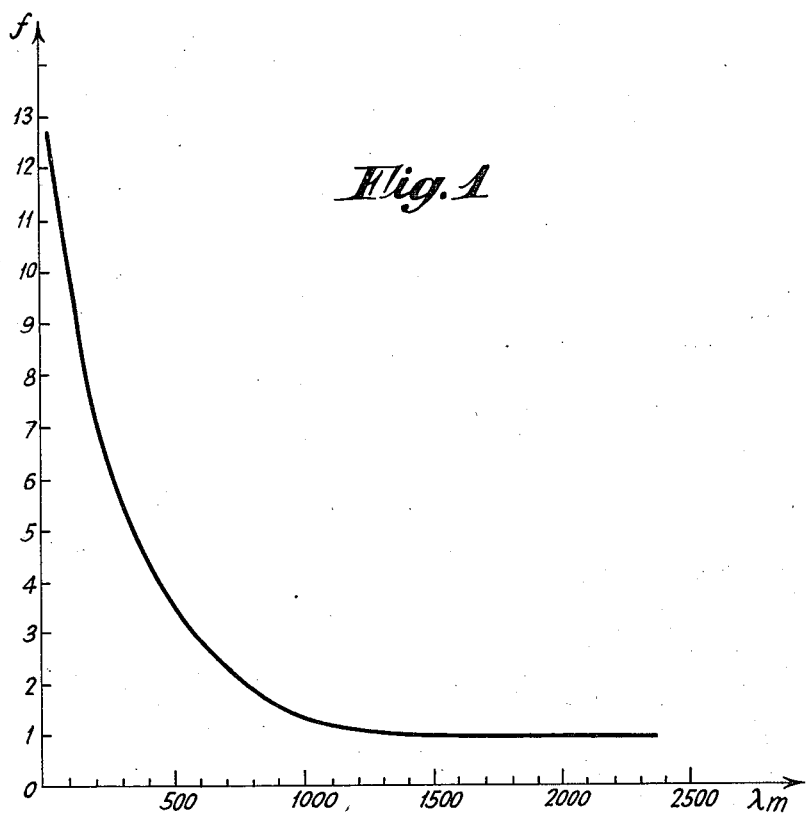
Fig. 1 is a curve plotted to indicate the errors over wave length.

But the modern tendency and the necessity is to also utilize medium and short waves for direction finding. To transform this desire or tendency into a fact is met by a number of constructional difficulties. Goniometric error FB and auxiliary antenna HAB depend to a large extent on frequency. In Fig. 1 are plotted the amounts of correction (error $f$) over the wave length $\lambda$. As may clearly be seen from the curve, it has an approximately parallel course to axis of abscissa from $\lambda=1000$ meters towards the longer waves, but the curve rises so sharply below $\lambda=1000$ meters that a single cam is no longer sufficient, but that the frequency band below 1000 meters must be subdivided into a large number of correction ranges if correct finding results are to be obtained.

For each wave length could be provided separate FB- and HAB-discs exchanging same when changing from one wavelength to another. This proposal is, however, hardly practical.

The present invention is concerned with an all-wave direction finding station with so-called two-step operation. Only the wavelength at direction finder and the direction of the finder antenna are to be adjusted by hand. For the regulation of the goniometric error and auxiliary antenna, mechanical arrangements are provided which allow the covering of the entire frequency relation automatically, for example, by rotation of a variable condenser or inductive elements, in a manner that the true direction finding value may be read on the direction scale dial of the vessel without interpolation calculations and slow operating moves.

Accordingly, in place of the cams to be exchanged individually, use is made in accordance with the invention of a three-dimensional control cam member or one which changes its contour in both a vertical and a horizontal plane.

This control cam member may, for instance, be imparted the shape of a truncated cone whereby the meridianal generatrices of this truncated cone need, of course, not be straight lines. For the exploring of this correcting body is provided a pickup element similar as in the case of the correcting cams. With a change in wavelength, the exploring or pickup element must be adjusted along the generatrix of the correcting body in question. With changes in the frame position, the exploring or pickup element moves on curved paths in planes at right angles to axis of cone.

A correcting body of this type suffices all demands put to it, but has, however, the disadvantage that its construction is difficult and expensive. Its preparation requires a number of special tools, which can, for instance, not be obtained on board a vessel, or which cannot be used in the manner required.

Hence, a construction of the control cam body is to be preferred whereby said body consists of a number of correcting cams which are combined without intermediate space to a magazine. These cams may be prepared without special expert knowledge and tools on board a vessel.

A further step may still be taken and use can be made of a relatively small number of discs only. Thus is insured in the first place a stepped adaption to definite frequencies only, but a continuous adaption may also be provided as will be disclosed in what follows. For the exploring or pickup element must be developed in the manner that it will be able to form any average value from the amounts of corrections of two cams of adjacent frequencies. It is possible thereby to use a limited number of five to eight discs for the frequency range of five thousand to one hundred meters, the discs being arranged at certain distance from each other without the danger of a noticeable increase of the corresponding error, that is an error that can no longer be neglected.

The invention has as its further object the automatic actuation or adjustment of the correcting body as function of the tuning of the direction finder and the directional adjustment of the frame antenna. It might, for instance, be feasible to use an all-wave receiver whereby the entire wave range, coming here under consideration, could be covered by the continuous movement of, for instance, a tuning dial. In such a case the movement of the pickup element along the correcting body should be coupled with the movement of the all-wave tuning dial.

For practical reasons, that is for effecting an easier and more exact tuning, the entire wave band of receiver will be subdivided into several smaller ranges. These ranges may be connected by means of a multi-contact switch while the individual wavelengths within a range will be adjusted by a continuous tuning movement, for instance by means of a rotary condenser or variometer.

In order to effect the moving of the correcting body as function of the frequency it is necessary to combine the multi-point switching arrangement and the continuous tuning movement at receiver to a rotary feed movement in the manner that to each wavelength is coordinated a positive shift or adjustment in one definite sense.

In addition of both movements may be accomplished in any desired manner, for instance along the lines of the electric remote measuring methods, such as used for summation of the individual data of spatially separated, but electrically coordinated power plants.

In the exemplified drawings, the summation of the movements will be accomplished by means of a speed-reducing or differential drive. A detailed explanation of the differential drive which is well known from the automobile industry will hardly be necessary in this specification.

The exemplified drawings 2 to 4 represent embodiments of the idea of invention. Fig. 2 shows the assembly of the direction finding plant with rotatable two-dial operation for frequency and direction in its principle. Hand wheel $H_r$ in connection with scale $S_1$ for the course finding of the sense of direction of a vessel serves for setting the direction of frame antenna R and is connected therewith by, for instance, a rope drive L. Finder dial S of the vessel whose datum line is formed by the longitudinal axis of vessel is rigidly connected with the vessel and casing C. Compass K is arranged concentrically with dial scale S of vessel. Between finder scale of vessel and compass scale is provided indicator ring Z which is operated in dependence on the correcting body for the goniometric error or, as shown in the drawings, as function of a FB or goniometric error cam-plate magazine MFB and this in the manner that indicator ring Z allows the reading of the true bearing value at bearing scale S of vessel. The pick-up element $O_1$ at the FB cam-plate magazine MFB must be moved in the planes of the cams when the handwheel $H_r$ and therewith frame antenna R is shifted. For this purpose, handwheel $H_r$, exploring or pickup element $O_1$ and indicator ring Z actuated in cooperation with both, are connected through suitable driving devices, for instance gear wheels, wire drives, levers or chain and sprocket drives.

In Fig. 2, means are provided for coupling the handwheel $H_r$ with indicator ring Z the toothed wheels 1, 2, a differential drive $G_1$ and further toothed wheels 3 and 4. This drive $G_1$ is provided for correcting the indicated values. The amounts of correction (understood to be angular degrees) are transmitted in accordance with adjustment of exploring element $O_1$ as shown by Fig. 3, through toothed sector 9, connected rigidly therewith, over a shaft 5 to a lever arrangement 6 which may rotate around an axle 7. At the other end of lever 6 a knuckle joint 8 is provided engaging the same toothed sector 9 and this in immediate vicinity of main axle 10. At the opposite side of the toothed sector is disposed a toothed wheel 11 attached, together with the part of said drive $G_1$ facing the indicator ring and with toothed wheel 3, to one shaft.

Pickup element $O_1$ at the FB magazine MFB must be moved at right angles to the planes of the cams when the tuning at finder E is changed. Step or frequency switch $St$ which switches into circuit inductance or capacitive elements, and the continuous tuning dial D located at receiver E which tunes inductive or capacitive elements are connected with a cam U through a differential drive $G_2$ whose purpose and mode of operation is similar to the present-day automotive differential drive. The shape of cam U corresponds to the dependence between wave length and error $f$, as represented in Fig. 1. The selective adjustment of cam magazines MFB and MHAB is effected over an adjusting arrangement V actuating screw spindle or worm 12 which in turn guides exploring elements $O_1$ and $O_2$ by means of spindle nuts 13 and 14. For the purpose of clearly indicating the operation and coordination of the pick-up elements $O_1$ and $O_2$ with the groups of cams MFB and MHAB, the two center cams of each group are shown in elevation.

Figure 4:
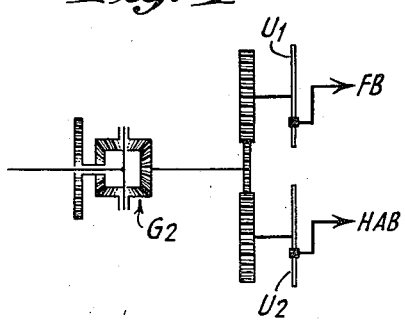
Fig. 4 is a diagram of the auxiliary antenna correcting arrangement.

If auxiliary antenna HAB has the same frequency course as goniometric error FB, the pickup element for regulation of HAB is actuated in conformity to that of goniometric error FB. But if the frequency courses of the two correcting arrangements deviate substantially from each other, separate cams $U_1$ and $U_2$ must be provided within the cabinet E of the receiver for coupling to the two independent shafts FB and HAB as shown in schematic manner in Fig. 4. The separate or subdivided cam $U_1$ is the goniometric error and $U_2$ is the auxiliary antenna error, each cam being interposed between the differential $G_2$ and the link members coupled to the main cam U, which link members are indicated on Fig. 4 as FB and HAB. The shape of the cams $U_1$ and $U_2$ is such that the sum of the individual cams gives a true or correct reading when coupled to main cam U.

Figure 5:
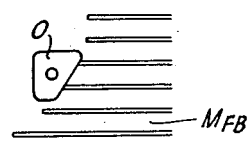
Fig. 5 is a detail of the pickup element.

In Fig. 5, is represented the pickup element O, such as is required for the exploration of a correcting cam magazine. Each cam is arranged for a definite wavelength. Now, in order to be able to equalize the error within a certain range of wavelength, exploring element O must be developed in the manner that it is in a position to form the average value between the correction amounts of two adjacent cams. In the most simple case, the exploring element O consists of a lever pivoting around an axis through which passes the cutting edge of a sliding shoe attached to end of lever.

The radius of curvature is preferably chosen somewhat smaller than the least curvature which would appear in a correcting body made, for instance, of solid material.

The regulation of the auxiliary antenna in receiver E is accomplished in dependence on HAB magazine MHAB through lever 15, bar 16, toothed segment 17 and gear 18 on axle HAB of auxiliary antenna adjustment of receiver E.

For avoiding errors in reading, which may happen by a side-way observation of the over-all bearing reading arrangement, bearing scale S, indicator ring Z and compass scale K will be arranged as shown in Fig. 2, in the same plane and arrangements should be made for an illumination of the scales at night free from shadows.

What is claimed is:

1. A direction finder mechanical compensator in which an auxiliary antenna is simultaneously adjusted with different angular positions of a rotatable loop over a wide band of frequencies, comprising a loop antenna and an auxiliary antenna, a shaft coupled to said loop antenna for rotation thereof, a plurality of cams each having a different contour spaced apart from each other and secured to rotate with said shaft, a guide member arranged to bear against at least one of said cams, and means coupled to said guide member whereby the electrical value of said auxiliary antenna is changed as said loop is rotated.

2. A direction finder mechanical compensator in which an auxiliary antenna is simultaneously adjusted with different angular positions of a rotatable loop over a wide band of frequencies, comprising a loop antenna and an auxiliary antenna, a shaft coupled to said loop antenna for rotation thereof, a cam member whose contour is changed in both a vertical and a horizontal plane, said cam member secured to rotate with said shaft, a guide member arranged to bear against said cam, and means coupled to said guide member whereby the electrical value of said auxiliary antenna is changed as said loop is rotated.

3. A direction finder mechanical compensator in which an auxiliary antenna is simultaneously adjusted with different angular positions of a rotatable loop over a wide band of frequencies, comprising a loop antenna and an auxiliary antenna, a shaft coupled to said loop antenna for rotation thereof, a cam member whose contour is changed in both a vertical and a horizontal plane, said cam member being in the form of a truncated cone and secured to rotate with said shaft, a guide member arranged to bear against said cam, and means coupled to said guide member whereby the electrical value of said auxiliary antenna is changed as said loop is rotated.

4. A direction finder mechanical compensator in which an auxiliary antenna is simultaneously adjusted with different angular positions of a rotatable loop over a wide band of frequencies, comprising a loop antenna and an auxiliary antenna, a shaft coupled to said loop antenna for rotation thereof, a cam member whose contour is changed in both a vertical and a horizontal plane whose dimensional arrangement corresponds in one direction of coordinates to the dependence on frequency and whose dimensional arrangement in a direction at right angle thereto corresponds to the directional dependence of said loop antenna, said cam member secured to rotate with said shaft, a guide member arranged to bear against said cam, a plurality of control bodies, a bearing scale, and coupling means coupled to said guide member for causing said plurality of control bodies to be moved between said shaft and said bearing scale to regulate the electrical value of said auxiliary antenna as said loop is rotated.

5. A direction finder mechanical compensator in which an auxiliary antenna is simultaneously adjusted with different angular positions of a rotatable loop over a wide band of frequencies, comprising a loop antenna and an auxiliary antenna, a shaft coupled to said loop antenna for rotation thereof, a plurality of cams each having a different contour spaced apart from each other and secured to rotate with said shaft, a plurality of guide members in the form of a sliding shoe at least one of which has means to contact the edges of at least two adjacent cams and bridge the intermediate space therebetween, and coupling means arranged between said sliding shoe and said auxiliary antenna to transmit the average value of said two adjacent cams whereby the electrical value of said auxiliary antenna is changed as said loop is rotated.

6. A direction finder mechanical compensator in which an auxiliary antenna is simultaneously adjusted with different angular positions of a rotatable loop over a wide band of frequencies, comprising a loop antenna, an auxiliary antenna having rotatable tuning means, a mechanical compensator and a receiver mechanically coupled together, said compensator having rotatable means to rotate said loop antenna, a shaft secured to said rotatable means and located in the center portion of said compensator, said receiver having switching means to cover a wide band of different frequency ranges by dividing said receiver into individual stages, continuous tuning means located adjacent said switching means, a mechanical drive coupling said switching means for the continuously tuning movement within a different frequency range, said mechanical drive having a second coupling means to present a continuous rotating movement with said mechanical compensator, a plurality of cams secured to said shaft and located within said compensator, each one of said cams having a different contour, said cams spaced apart from each other on said shaft, a guide member having means to bear against at least one of said cams, and coupling means for coupling said guide member, rotatable tuning means of said auxiliary antenna and said mechanical drive of said receiver whereby the electrical value of said auxiliary antenna is changed as said loop is rotated.

7. A direction finder mechanical compensator in which an auxiliary antenna is simultaneously adjusted with different angular positions of a rotatable loop over a wide band of frequencies, comprising a loop antenna, an auxiliary antenna having rotatable tuning means, a shaft coupled to said loop antenna for rotation thereof, a mechanical compensator and a receiver with a tuning shaft coupled together by a plurality of cams and gear reduction units, said cams having securing means for rotation with said loop shaft, a guide member arranged to bear against at least one of said cams, and means for coupling said loop shaft and auxiliary antenna coupling tuning means with said guide member and said gear reduction units whereby the electrical value of said auxiliary antenna is changed as said loop is rotated.

8. A direction finder mechanical compensator in which an auxiliary antenna is simultaneously adjusted with different angular positions of a rotatable loop over a wide band of frequencies, comprising a loop antenna, an auxiliary antenna having a rotatable tuning means, a shaft coupled to said loop antenna for rotation thereof, a mechanical compensator coupled to said loop shaft, a group of control cams having a plurality of individual disc-like cams spaced apart from each other and secured around said loop shaft, a plurality of pick-up elements bearing on the outside point between said shaft and a bearing scale of a contour of said cams and located intermediate a vessel, and coupling means with said pickup elements for coupling the movement of the loop shaft with a regulating arrangement coupled to said auxiliary tuning means for altering its electrical value as said loop is rotated.

9. An arrangement according to claim 8 with the characteristic feature that the pick-up elements are in the form of a sliding shoe with contact means to bridge the intermediate space between two adjacent disc-like cams and to transmit the average value of the two cams to the regulating arrangement coupled to the tuning means on said auxiliary antenna whereby the electrical value is changed as said loop is rotated.

10. A direction finder mechanical compensator in which an auxiliary antenna is simultaneously adjusted with different angular positions of a rotatable loop over a wide band of frequencies, comprising a loop antenna, an auxiliary antenna having rotatable tuning means, a shaft coupled to said loop antenna for rotation thereof, a mechanical compensator and a receiver tuning shaft including a dial coupled together by a plurality of cams and gear reduction units arranged on said shaft which is coupled to said loop antenna, said cams being coupled by means of a differential drive to rotate with said dial, a guide member arranged to bear against at least one of said cams, and means for coupling said guide member with said gear reduction units and said rotatable tuning means whereby the electrical value of said auxiliary antenna is changed as said loop is rotated.

AUGUST LEIB.